United States Patent [19]

Liller

[11] 4,159,073

[45] Jun. 26, 1979

[54] METHOD OF MANUFACTURING AND INSTALLING AN INLET LINE DEFLECTOR IN A CENTRIFUGAL CYCLONE FOR WASHING COAL

[76] Inventor: Delbert I. Liller, Rte. 4, Box 64, Deer Park, Md. 21550

[21] Appl. No.: 926,168

[22] Filed: Jul. 19, 1978

Related U.S. Application Data

[62] Division of Ser. No. 860,330, Dec. 14, 1977.

[51] Int. Cl.[2] ........................ B23K 28/02; B04B 11/00

[52] U.S. Cl. .................................... 228/125; 228/170; 228/182; 138/39; 209/211

[58] Field of Search ............... 228/125, 170, 171, 182; 138/39, 40; 209/144, 211

[56] References Cited

U.S. PATENT DOCUMENTS

| | | | |
|---|---|---|---|
| 911,258 | 2/1909 | Neumann | 209/144 |
| 3,288,286 | 11/1966 | Prins et al. | 209/211 |
| 3,687,360 | 8/1972 | Prew et al. | 138/39 X |
| 3,938,233 | 2/1976 | Cannon | 228/125 X |

*Primary Examiner*—Francis S. Husar

*Assistant Examiner*—Kenneth J. Ramsey

*Attorney, Agent, or Firm*—Abraham A. Saffitz

[57] ABSTRACT

The invention relates to a process for the manufacture of a generally flat triangularly shaped metal deflector for installation to the interior non-tangential surface of an inlet pipe to the bowl of a centrifugal separating cyclone. The deflector constricts the inlet cross section to the bowl by about 19% to about 32%. The process comprises the steps of selecting a pipe section of the same size as the inlet pipe and marking the chord ends at the center angle between 118° and 149°, preferably close to 120°; marking the chord on a template sheet to fix the width of the base of the deflector pattern; determining the length of the deflector at its triangular apex and so marking the template sheet; cutting the sheet at the base and cutting the triangular sides slightly beyond the edges for later trimming near the apex; trimming the top apex of the sheet to form a short straight line parallel to the base and trimming the sides to form arcuate sides, thereby completing the deflector pattern; cutting a metal sheet to the form of the deflector pattern; and welding the cut deflector at its side edges and apex within the pipe at an angle of 8° to 12°.

7 Claims, 29 Drawing Figures

LEGEND $C_L$ LIGHTEST SOLIDS $C_{L1}$ NEXT LIGHTEST SOLIDS $C_{L2}$ NEXT LIGHTEST SOLIDS $R_{h1}$ NEXT HEAVIEST SOLIDS $R_h$ HEAVIEST SOLIDS

LEGEND

- $C_L$ LIGHTEST SOLIDS
- $C_{L1}$ NEXT LIGHTEST SOLIDS
- $C_{L2}$ NEXT LIGHTEST SOLIDS
- $R_{h1}$ NEXT HEAVIEST SOLIDS
- $R_h$ HEAVIEST SOLIDS

Fig. 5.
Fig. 5A.
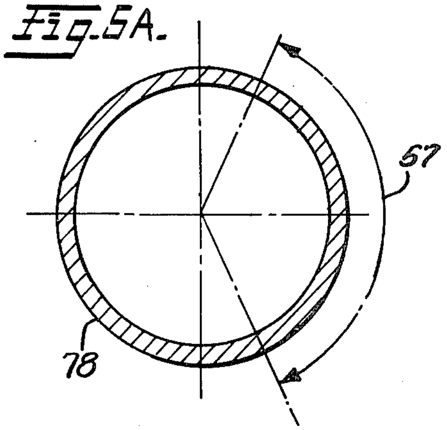
Fig. 5B.
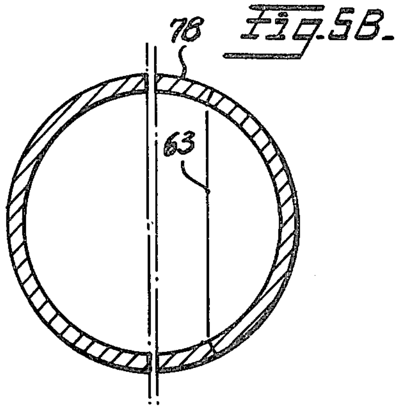
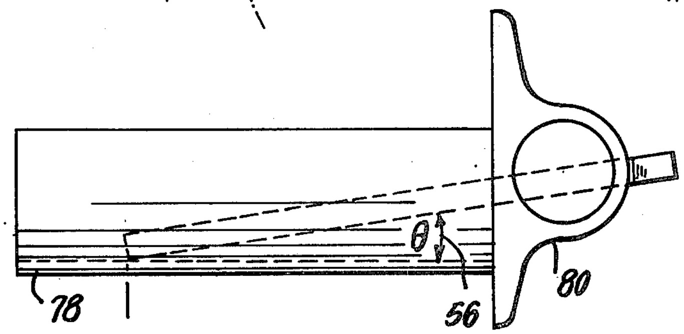
Fig. 5C.
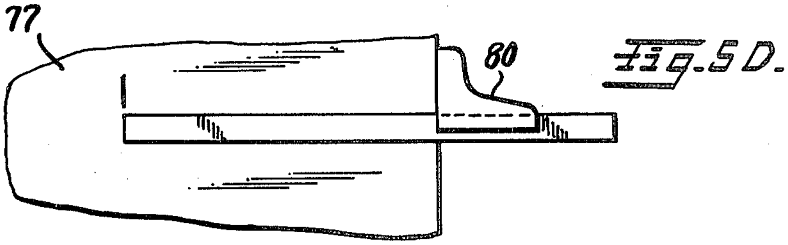
Fig. 5D.
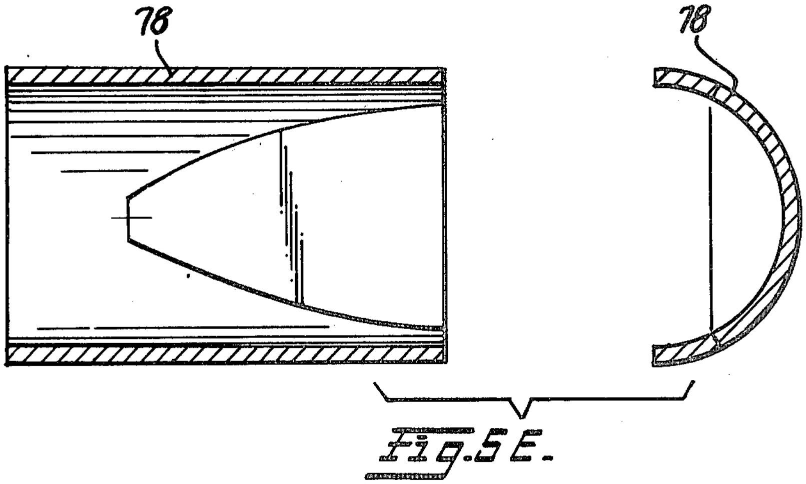
Fig. 5E.

Fig. 5.
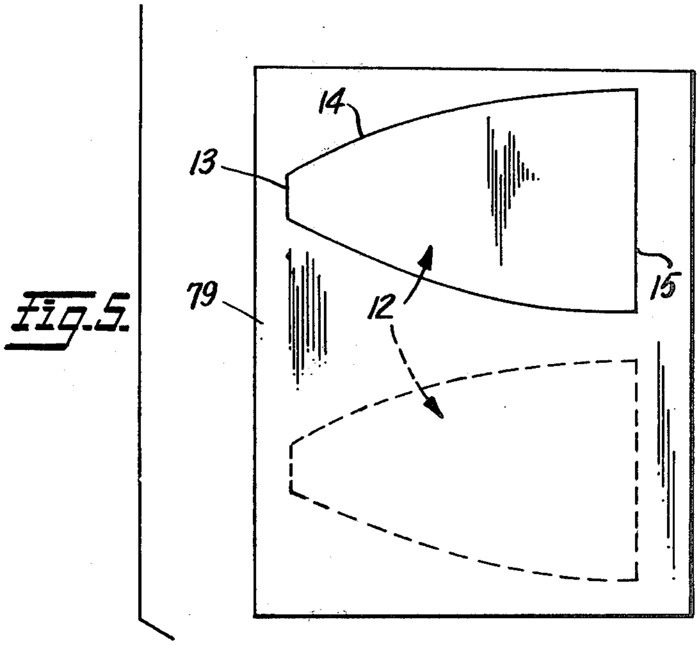
Fig. 5 F.
Fig. 6A.
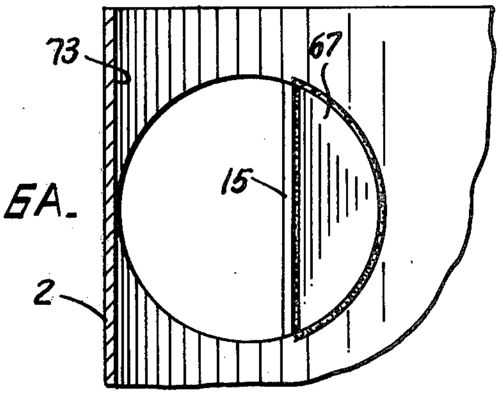
Fig. 6.
Fig. 6B.
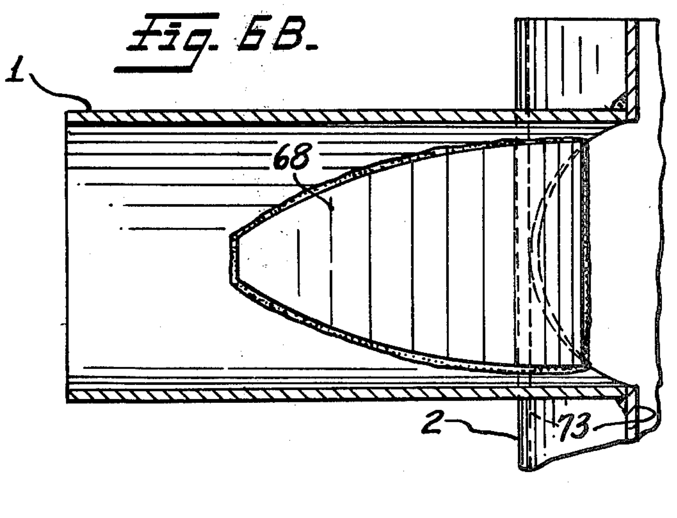

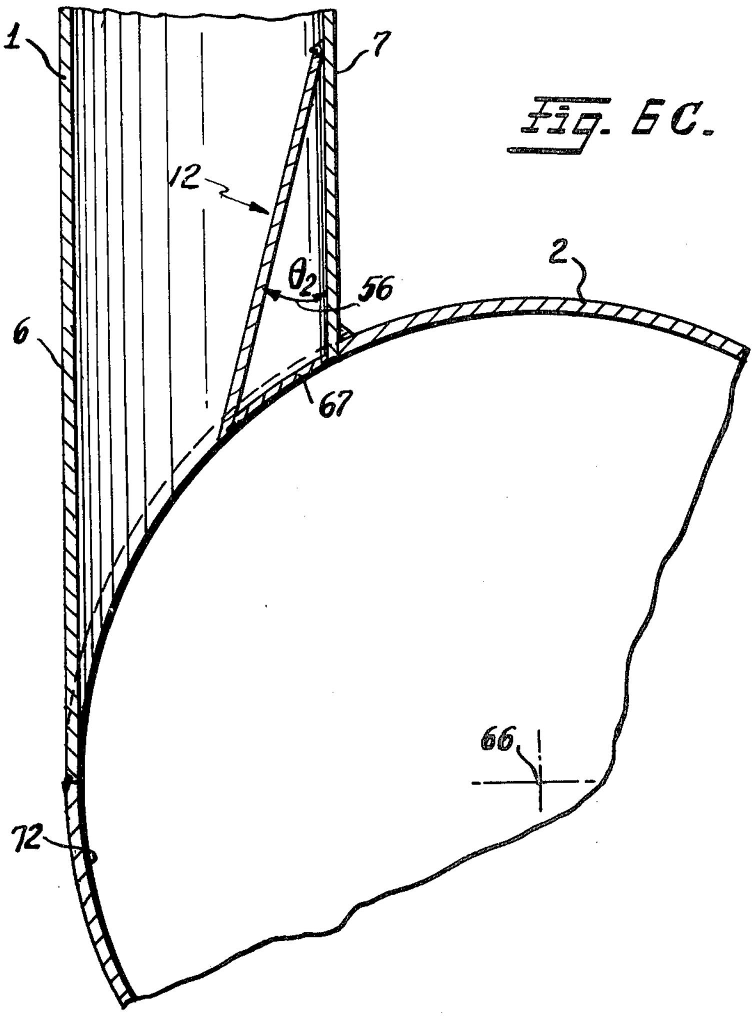
Fig. 6C.
Fig. 6.
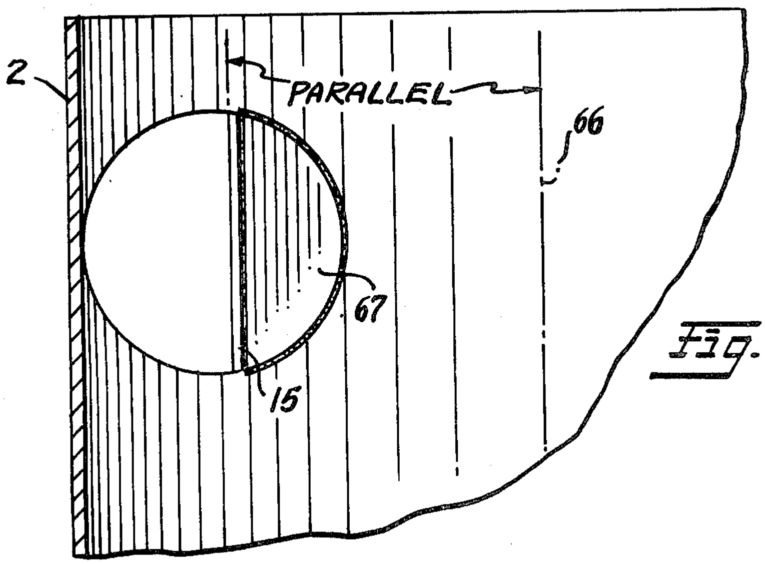
Fig. 6D.

1ST STAGE

METHOD OF MANUFACTURING AND INSTALLING AN INLET LINE DEFLECTOR IN A CENTRIFUGAL CYCLONE FOR WASHING COAL

CROSS REFERENCE TO RELATED APPLICATIONS

This is a division of application Ser. No. 860,330, filed Dec. 14, 1977.

| Case No. | Title |
|---|---|
| 1 | Inlet Line Deflector And Equalizer Means For A Classifying Cyclone Used For Washing And Method Of Washing Using Deflectors And Equalizers, Serial No. 860,330, Filed December 14, 1977 |
| 2 | Method And Apparatus For Testing and Separating Minerals, Serial No. 860,331, Filed December 14, 1977 |
| 3 | Dimensioning Of Vortex Finder, Orifice Diameter And Construction Of Shallow Dish With Tapered Orifice For Streamlined Flow Cyclone Washing Of Crushed Coal, Serial No. 002,731, Filed January 11, 1979 |
| 4 | Coal Washing Plant Using Deflectors, Serial No. 926,058, Filed July 19, 1978 |

BACKGROUND OF THE INVENTION (1) Field of the Invention

This invention lies in the field of centrifugal gravity separation apparatus, especially cyclones for specific gravity separation of solid particles and methods of using such apparatus for the cleaning of sized and crushed coal and similar ores wherein the cleaning liquid is water which is mixed with the coal or the ore. Control of velocity and solids content separates the crushed particles according to gravity, the lighter particles constituting the purified coal in the case of coal washing escaping through the cyclone box at the top and the heavier gravity particles constituting rock, ash and other impurities falling out at the bottom. The cyclones may be placed in several groups in series or in parallel.

(2) Description of the Prior Art (a) Economic Background

Coal is consumed in greater tonnage than most commodities produced by man, annual production in 1964 averaging about 400 million metric tons in the United States and 2,600 million metric tones for the entire world. Coal reserves far exceed the known reserves of all other mineral fuels (petroleum, natural gas, oil shale, and tar sands) combined in the United States and for the world as a whole. Since the supplies of other fuels, especially oil, are now becoming depleted and as industrial growth continues, coal is once again being used in larger and larger amounts.

The need for washing or cleaning coal has long been recognized. Coals of high and medium rank as classified by ASTM (see Kirk-Othmer, *Encyclopedia of Chemical Technology,* Vol. 5, 1964, page 651, John Wiley and Sons) must be sized and washed to meet industrial specifications.

In England in 1934 there were 611 washeries and 150 dry cleaner plants to handle only 40% of the output. Coal at that time was generally hand picked and hand washed. Only by the considerable efforts of the Ministry of Fuel and Power was sizing introduced in England. For industrial use sizing, it was pointed out at page 22 of the text "The Efficient Use of Fuel" by John Olsen, Chemical Publishing Company, 1945, that:

(1) sized coal avoids segregation and promotes efficiency of end use;

(2) if coal is not sized, there is uneven combustion and loss of energy when using automatic stokers;

(3) sized coal is a requirement in gasification, metallurgy and steam generation;

(4) sizing is an important asset in power generation by producing a fuel bed of uniform resistance to passage of air or gasification.

Even though coal was known and used by the ancients in Greece, Italy and China more than 2,000 years ago, it is only in the last 25 years that mining, preparation, storage and transport have all become more or less mechanized. Of these, the greatest progress in automation has been in mining. The least progress has been in coal preparation, e.g., in mechanical or chemical cleaning compatible with the regulations to protect the environment, especially the air pollution requirements and the more stringent demands made by industrial customers for maximum efficiency of coal product and cost effectiveness of preparation procedures. Lack of progress is not due to the poverty of ideas or washing or cleaning methods or systems which include:

(1) jig washing
(2) heavy media washing using expensive magnetite
(3) trough washing
(4) use of washing tables
(5) cleaning of coal dust
(6) froth flotation using chemical flotation or frothing agents.

None of the above systems permits a single washing station to handle the output of a large mine or a number of small mines and thereby reduce costs. Each of the above methods achieves quality product at high cost. It is the high cost to which the present simple, automatic operation of the invention provides an entirely new approach and an environmentally satisfactory solution.

(b) Prior Chemical Machinery Used in Coal Grinding and Washing

In the well known text by Ernie R. Riegel entitled *Chemical Machinery* published by Reinhold Publishing Company, 330 West Forty Second Street, New York, N.Y. (1944) at page 21, there is shown the commercially available standard double roll crusher which serves to produce the raw crushed coal for the coal pile which is the starting material after it is sized. At page 53 of this text there is shown the screen machine which sizes the crushed coal, larger pieces being returned to the crusher. The screen machine preferred for coal is a one surface Tyler-Niagara screen machine or equivalent which produces a product of $\frac{3}{4}$"×0.

Belt conveyors of known type as shown at page 79 of the text bring screened coal into a conventional slurry tank which is fed with water in a separate line to proportion solids to between 18% and 50% by weight. This is all the mixing which is required before entering the pump, which is a conventional centrifugal pump of the volute type shown in FIG. 95 at page 121 of the text.

These preliminary steps are the prologue to the invention.

(c) Prior Patents

Fitch, U.S. Pat. No. 2,981,413 dated April, 1961, proposed the use of a vortex finder as classifier means in a large capacity cyclone for the separation of fines from coarse particles in a process of separating solids in liquid suspension. The vortex finder is identified by reference 21 in Fitch and is described at column 6, line 63, as a withdrawal conduit adapted, by virtue of its placement along the central vertical axis of the cyclone, for continuous withdrawal of fines in the overflow at an accelerated rate relative to the rate of removal of coarse particles at the bottom. Fitch classifies and separates fines from coarse and shows the location of adjustment of the bottom of the inner vortex finder relative to the conical bottom of the cyclone for best separation and also shows a fixed location of an outer vortex finder. Fitch's objective in using two vortex finders was to eliminate energy loss due to turbulence (see column 8, lines 51–52). Because of large capacity Fitch had to live with turbulent flow.

Visman, U.S. Pat. No. Re. 26,720 dated November, 1969, was the first to realize success in keeping size separation, as in Fitch, to a minimum while achieving gravity separation using finely crushed coals 1"×0. Visman's examples are all of ¼"×0 at low pulp solids of about 10%. Visman contemplated cyclone diameters as large as 24" and as small as 2". Visman described a cyclone capacity of 70 tons per hour at relatively high velocities above 6 psig.

Gay, U.S. Pat. No. 3,926,787, used much coarser crushed coal than Visman, e.g., 1¼"×0, and taught substantially higher coal solids in the pulp, at column 9, line 19, with the optimum at 15% for strip mine coal. Despite the higher coal solids in the pulp and his stated objective of maximum capacity for washing purification, e.g., a value of 48 tons/hour on a dry weight basis (see column 9, line 26). It was clearly stated by Gay that both size and gravity separation were achieved under his turbulent mixing and operating conditions. Thus Gay achieved washing purification at about the same pulp solids as Visman without in any way dealing with the loss of energy due to turbulence which was described earlier by Fitch. While Fitch added a second vortex finder to diminish turbulence once started, Gay created turbulence in his special mixing chamber which delivered pulp to the cyclone.

Other patentees have proposed deflection surfaces and deflectors, for example Prins et al, U.S. Pat. No. 3,288,286, of November, 1966, and Hebb, U.S. Pat. No. 2,616,563, of November, 1952.

Prins et al shows a deflection surface which constricts incoming flow but there is no placement of the constriction to divert all of the particles to the single inlet tangential wall of the cyclone.

Hebb shows two deflectors 22 and 23 within the bowl itself, these starting at the end of the inlet pipe. Hebb separates by size and not by gravity (see column 5, lines 64–75). The deflectors or vanes control radial speed by restricting flow and directing the particles to the inner wall or box of the cyclone, thereby creating turbulence due to the reverse travel of the particles to the outer wall of the bowl.

OBJECTS OF THE INVENTION

A primary object of the invention is to clean coal at low cost and at the highest possible efficiency (about 98% based on clean coal gravity test) using water in a low cost and easily maintained washing apparatus, namely, a centrifugal cyclone which separates crushed coal from refuse via separate outlets.

Another object of the invention is to substantially eliminate the turbulence encountered in the prior art, especially as encountered in Gay, Hebb, Visman, and Fitch without the need for a second vortex finder or a specially shaped expensive inlet casting as in Prins et al or in Visman by providing an inlet deflection surface at the base of the inlet pipe for pulp entry into the cyclone bowl whereby laminar flow is assured at the start of the first centrifugal turn, all of the particles being directed toward the outer tangential wall of the bowl, thereby eliminating any chance of turbulence arising from reverse flow of heavy particles to the outer wall.

A further object of the invention is to provide a deflection surface which is critically located at the mouth of the cyclone bowl but does not enter the bowl, whose placement is uniquely determined by the center angle, the deflection angle and the included angle, all of which are defined hereinafter.

Another object is to provide a simple and accurate method for manufacturing the deflection surface and installing it into a cyclone plant.

A still further object is to further promote laminar flow achieved by the use of the aforesaid deflection surface of critical parameters at the inlet mouth of the cyclone and wholly within the inlet to the bowl by simultaneously increasing the centrifugal velocity and the pulp solids thereby weighting the outer or tangential wall of the cyclone bowl with a higher mass than in prior art methods of cyclone separation of several solids by gravity rather than by size so as to thereby achieve higher efficiencies in cleaning of coal or ores.

Another object of the invention is to increase efficiency of the aforesaid method of laminar flow separation by gravity to minimize size separation of fines and thereafter recycling the fines so separated in a battery of cyclones modified with the deflection surface of the invention whereby the recycled fines promote the gravity separation of clean coal from dirty coal to provide the advantages of a heavy medium plant using a magnetite medium at the cost of water.

Still another object of the invention is to provide a cyclone battery in series or in parallel, using suspended fines in recycled water as a coal separating medium under the action of a deflection surface at the inlet mouth to the cyclone bowl, thereby avoiding the need for recovery of the fines which in the absence of recycling will require special equipment for recovery and after recovery the expense of special storage to prevent mechanical losses.

A further object of the invention is to use the fines in battery cyclones as a means to drive clean fines into the fine coal dryer stage of the battery and out of which the clean coal in fine particle size emerges from a centrifugal cyclone which is part of the cyclone battery in the invention.

Still a further object of the invention is to provide a battery of cyclones fed by means of distributors for the in-feed pulp which distributors are provided with flow equalizers to prevent particle segregation before entering the mouth of the cyclone bowl.

SUMMARY OF THE INVENTION

An inlet line deflector is provided in the feed line to a centrifugal cyclone washing crushed and sized coal or ore in water fed into the cyclone either directly from a slurry tank or from a distributor line connected to the slurry tank which serves to feed two or more cyclones by take-off pipes from the distributor line.

Equalizing means are provided in the distributor line to assure equal distribution of crushed sized particles in the slurry throughout the cross section of the distributor, thereby assuring the equipartitioning of solids to each cyclone at each take-off.

Because the slurry is pumped at high solids of about 18% to 50%, at high velocity of about 18 to 28 feet per second and is deflected by the flat surface of a critically placed deflector, a new laminar flow is created at the mouth of the inlet. This deflector is located on the inlet non-tangential wall of the inlet pipe leading into the cyclone so that all of the particles start their swirling motion at the inner wall of the bowl which is the inlet side of the bowl rather than at the box wall of the vortex finder of the cyclone and gravity separation occurs. Due to the deflector the swirling motion at the top of the bowl creates laminar flow in the cyclone right from the start as a direct consequence of the uniquely placed deflection surface at three critical angles, namely the center angle which relates to the chord formed by the deflector with the circular perimeter of the inlet pipe, the deflection angle which relates to the angle between the inlet pipe non-tangential wall and the edge of the deflector surface, and the included angle which relates to perpendicularity of the inlet pipe to the cyclone bowl as it affects the laminar thrust of particles toward the inner wall of the bowl of the cyclone.

The conventional adjustable vortex finder is an 8" outer diameter pipe (7⅞" inner diameter) in an 18" cyclone and permits precise location of the generally vertical layer of the lights for removal from hypothetized parallel layers of middlings and heavies outwardly spaced therefrom. The lights, which are of low specific gravity, are located immediately adjacent the outer wall of the box and are removed by scalping, followed by upwardly swirling deflection to exit past the inner vertical wall of the vortex finder and then continuing out of the clean coal exit pipe above which is removed the desired clean coal slurry product out of the center top part of the cyclone.

At the shallow conical bottom of the cyclone an outlet orifice permits removal of heavies and middlings which come from the outer lamina adjacent the outer wall of the bowl, these being removed at a slower rate because these particles necessarily travel a shorter distance as a result of the vertical stratification achieved under a constant flow rate and substantially constant pressure conditions.

Two forms of generally flat deflectors and their method of manufacture are shown and described, the first a truncated spherical triangle welded at the apex and opposing arcuating edges useful for lower diameter centrifugal cyclones (e.g., about 4 inches to 20 inches) and the second a triangle formed as a bevelled trapezoid having divergent opposing straight edges rather than curved edges. This second form is especially suitable for higher diameters, above 20 inches and up to 48 inches. The serviceability and life expectancy of the bevelled trapezoid embodiment is superior because welding is more easily accomplished and the quality of the welded product is generally superior.

Although water is the preferred liquid for washing coal by the unique streamlining action of the novel deflection surface of the present invention, equally good results are obtained with water-magnetite suspensions used in heavy media coal cleaning plants. Accordingly, the term water includes all water containing washing media.

BRIEF DESCRIPTION OF THE DRAWINGS

FIG. 5 is a diagrammatic view of the separate steps 5A through 5F of the method of making a template and manufacturing the deflector of the truncated spherical triangle or the truncated trapezoidal triangle deflector, in which:

FIG. 5A shows center angle measurement;

FIG. 5B shows chord location;

FIG. 5C shows deflection angle measurement;

FIG. 5D shows template length measurement;

FIG. 5E shows final cutting of template; and

FIG. 5F shows deflector cutting from FIG. 5E template; and

FIG. 6 is a diagrammatic view of the separate steps 6A through 6D of the method of installing a deflector, wherein:

FIG. 6A shows deflector welding shown from the end;

FIG. 6B shows arcuation side and apex welding;

FIG. 6C shows a top view of the installation in relation to the cyclone bowl;

FIG. 6D shows deflector base alignment; and,

BRIEF DESCRIPTION OF THE PREFERRED EMBODIMENTS

(A) INSTALLED LOCATION OF FLAT DEFLECTORS 68A OR 68B IN CENTRIFUGAL CYCLONE 19, CYCLONE 38, OR CYCLONE 41 OR OTHER CYCLONES

Figure 1:
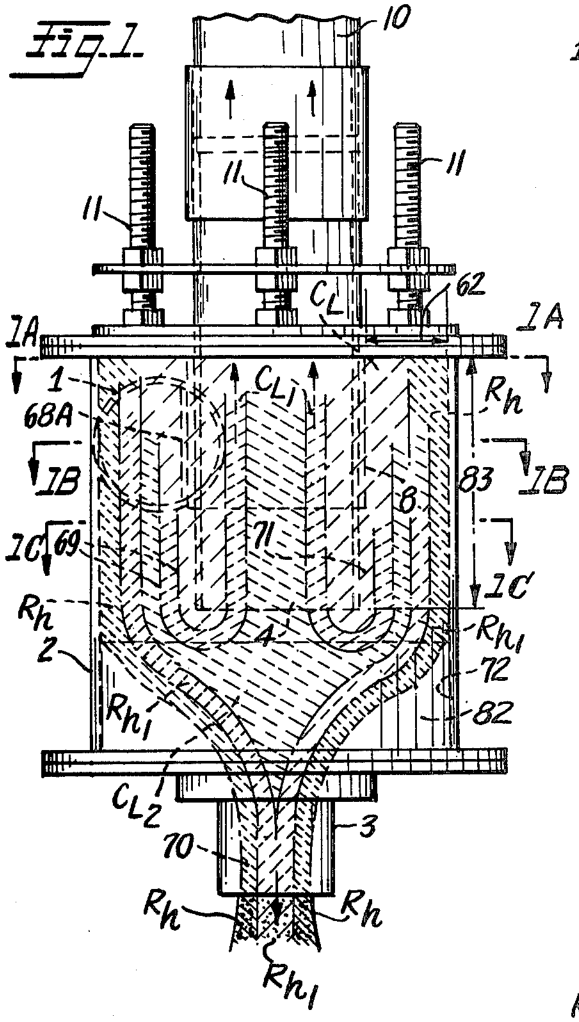
FIG. 1 is a diagrammatical side elevation view with interior parts shown in dotted line illustrating a truncated spherical triangle deflector used for smaller pipe diameters installed at critical angles in the inlet pipe at the mouth of a centrifugal cyclone.

There is shown in FIG. 1 a front view of a centrifugal cyclone 19 fitted with deflector 68A for use in a primary stage of coal washing. A similar view of deflector in cyclone 38, for use in a secondary stage, is shown in FIG. 1B. FIG. 1 shows the interior parts of the cyclone in dotted lines including deflector 68A and the development of vertical stratification layers 69, 70 and 71 in the cross hatched shading resulting from the installation of the deflector 68A, best shown in FIG. 3.

Layer 69 is the middling layers and the strata are denoted by $C_{L1}$, $C_{L2}$, and $R_{h1}$. In coal washing which is the main objective, $C_{L1}$ as illustrated may be the 1.5 specific gravity layer containing the 1.5 specific gravity middlings, $C_{L2}$ may be the 1.6 specific gravity layer containing the 1.6 specific gravity middlings and $R_{h1}$ may be the 2.6 specific gravity layer containing the 2.6 specific gravity clays. Layer 70 is the highest specific gravity layer containing the heaviest materials as denoted by $R_h$. Layer 71 is the lightest specific gravity layer containing the 1.4 specific gravity and the lighter products are denoted by $C_L$.

Coal has a specific gravity ranging from 1.3 to 1.6 depending on inherent impurities. Clays, shales, rock and other contaminating materials have specific gravity varying from 2.6 to 5.02 for iron disulfide or pyrite.

In order to meet the requirements of the present invention, a very sharp separation must occur between the stratified coal layer and its several contaminates which form stratified layers under gravity forces due to spiral flow downward at about 18 to 28 feet per second.

1. SEPARATION REQUIREMENTS

The explanation of separation which occurs due to the stratification of inflow into the bowl 2 between the box 8 and vortex finder 4 and the inner wall 72 of the bowl 2 can be understood from the following requirements:

(a) One must create an atmosphere of super gravity forces within the bowl 2 of the cyclone by swirling the liquid slurry at a high preset velocity which is determined by the diameter of the bowl and diameter of the inlet pipe 1 tangentially and transversely attached to the bowl 2.

The heavier and high specific gravity material will seek the inner wall of the cyclone bowl 2 and form a distinct layer separated from the lighter layer of material along the vertical side of the box 8 and adjustable vortex finder 4.

(b) The intermediate gravity particles 69 will seek different layers that correspond to their respective specific gravity. At the lower sections of the spiral downward flow the outer circumference of the swirling water will be under higher gravity forces because the centrifugal velocity is higher. The situation achieved in the invention yields a washing slurry in the bowl with vertical layers, each having a different specific gravity.

Compare Grant et al, U.S. Pat. No. 1,669,820, with respect to the vertical layers shown in FIGS. 1 and 2 of the present invention. Grant achieves horizontal layers by letting coal pile up on the bottom and forcing a flow in the horizontal direction from a secondary vortex. The present invention achieves the primary objective of cyclone separation, short residence time, low manpower requirements and high efficiency at low cost.

Figure 3D:
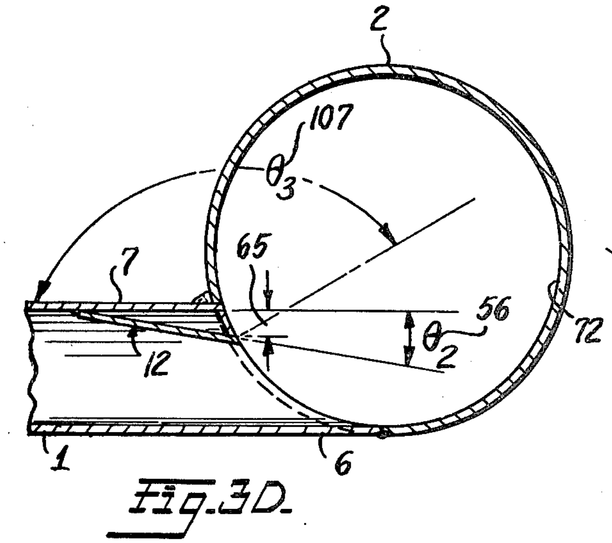
FIG. 3D is a top sectional view showing placement of the deflector of FIG. 3A in the inlet pipe and the critical angles of the deflection angle $\theta_2$ and the included angle $\theta_3$.
Figure 4D:
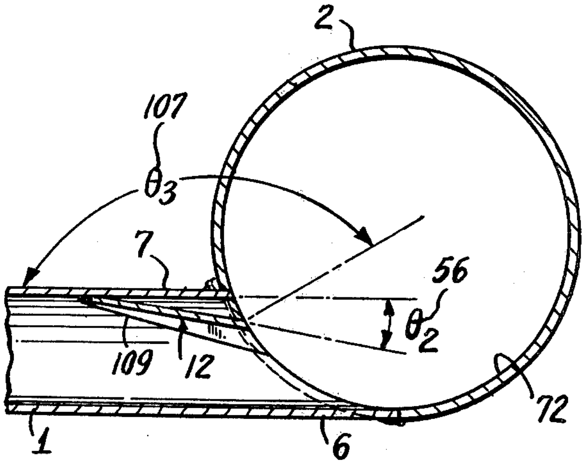
FIG. 4D is a top sectional view of the second embodiment in the inlet pipe showing the deflection angle $\theta_2$ and the included angle $\theta_3$.
Figure 4E:
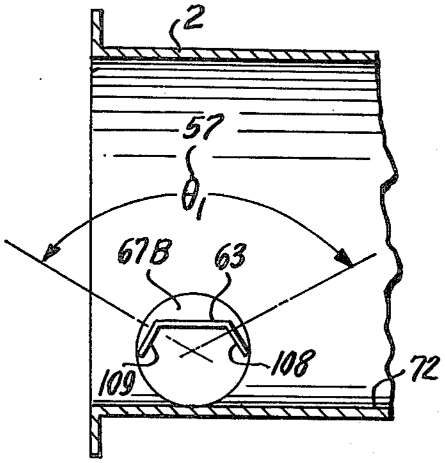
FIG. 4E is a side sectional view showing placement of the deflector of FIG. 4A in an inlet pipe and showing the critical center angle $\theta_1$.

FIG. 1 and FIG. 1B show the location and the laminar flow deflection which is uniquely created by the deflector. Two types of deflector are shown in FIGS. 3D and 4D. The truncated spherical triangular L-shaped streamline flow deflector 68A of FIG. 3D is mounted in FIGS. 1 and 1B.

In FIG. 1B there is shown a top view of the inlet feed pipe 1 illustrating the arcuation side 14 and the short leg of the L deflector forming cap 67A. The pulp slurry at high solids of 18% to 50% receives the initial compression and deflection thrust to propel the slurry towards the cyclone bowl inner wall 72 from the flat surface of the deflector 68A. The incoming slurry receives the final deflection thrust from the centrifugally swirling action of the slurry within the bowl 2. This swirling movement is illustrated in FIG. 1B, a top cross section at 1B—1B of FIG. 1 at the feed entrance into the cyclone bowl 2 near the tangential wall 6. These two thrust forces place all of the initial and final slurry solids, all of the light and heavy fractions, on the bowl wall 72 at the very start to carry out a primary objective of creating laminar flow at the start and providing every structural precaution to prevent turbulence thereafter.

Figure 1A:
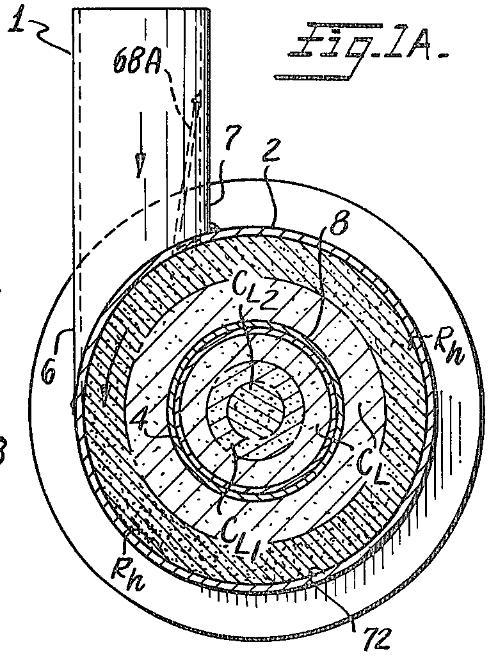
FIG. 1A is a sectional view along line 1A—1A of FIG. 1 showing the initiation of laminar flow at the top of the cyclone.
Figure 1C:
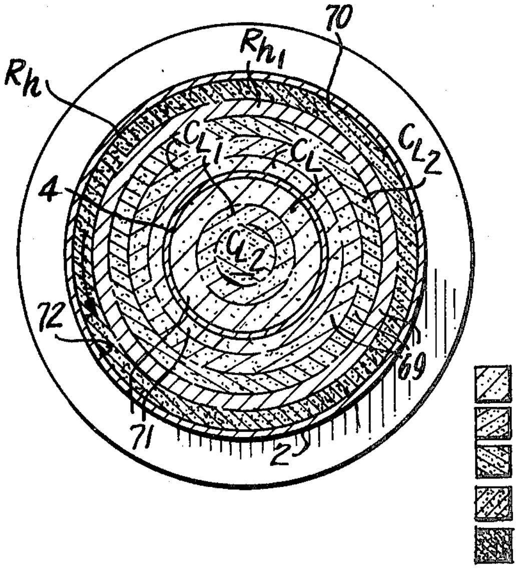
FIG. 1C is a lower sectional view than in FIG. 1B to show the formation of vertical layers due to stratification following the initial critical laminar flow resulting by deflection in FIG. 1B; taken on the line 1C—1C of FIG. 1.
Figure 1B:
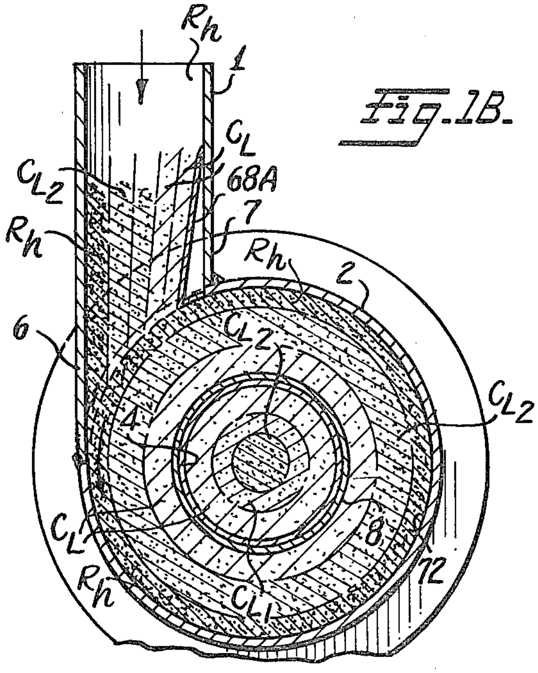
FIG. 1B is a sectional view along line 1B—1B of FIG. 1 showing the result of initial deflection by the deflector of FIG. 1 in a longitudinal direction parallel to the axis of the inlet pipe as the slurry of particles enters the cyclone.

At FIG. 1A, a top cross sectional view at 1A—1A of FIG. 1 illustrates the beginning of the vertical stratified layers 70 and 71. The solids begin seeking their respective layers on the first revolution around the cyclone box 8. The inner diameter of the adjustable vortex finder box 4, illustrated in FIG. 1A, 1B and 1C, shows a cross sectional view of the different specific gravity vertical stratified layers 69 and 71 of previously mentioned materials $C_L$, $C_{L1}$, and $C_{L2}$.

Layers 71 and the two lightest layers of 69 go through a helical reverse flow angle 73 before entering the inner diameter of box 4. The force necessary to create the reversal angle 73 comes from the throttling effect produced by the bottom orifice 3 inner diameter and the inlet pulp slurry pressure and velocity. As the product percent recovery increases the bottom orifice 3 diameter decreases, and vice versa.

FIG. 1B is a top cross sectional view at 1B—1B in FIG. 1 which illustrates the beginning of the development of layers 69, 70 and 71. FIG. 1C is the top cross section at 1C—1C of FIG. 1 which shows the complete formation of the arbitrary vertical stratified layers 69, 70 and 71 within the cyclone bowl 2 and the inside diameter of box 4.

FIG. 1 further shows the depth or path distance that all the solid particles will travel from the entrance into the bowl 2 of the inlet feed pipe 1 to the exit of the particles at either the clean coal exit pipe 10 or the bottom orifice 3 refuse exit.

Figure 2:
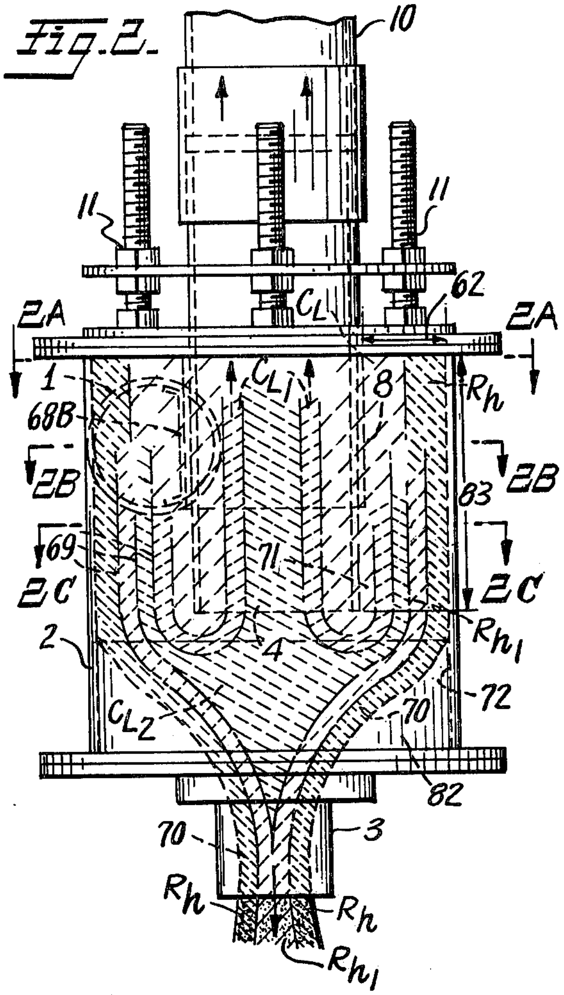
FIG. 2 is a diagrammatic view in side elevation with inner portions in dotted line of a trapezoidal-like bevelled triangular deflector used for larger pipe diameters and installed at critical angles in the inlet pipe.

As shown in FIGS. 1 and 2, the different layers 71, 69 and 70 starting from the center and following the radius of the cyclone bowl 2 take different paths of outflow and it is essential to avoid turbulence which destroys the laminar flow creating the layer or outflow.

2. WITHDRAWING HEAVIES AND LIGHTS

The embodiments of the invention provide enough range of gravity forces to cause a layer of heavy gravity material at the cyclone inner wall 72 near the exit therefrom at orifice 3 to leave the cyclone under a gravity force created by centrifugal action which will avoid turbulence due to diameter dimension of the orifice 3 which is less than the diameter of the inlet pipe. The adjustable cylindrical vortex finder 4 which forms the lower inner wall of the bowl 2 allows adequate room below the edge of the finder at the bottom of the cyclone to allow sufficient distance between the layers 70 and part of 69 of heavy particles and the layers 71 and part of 69 of lighter particles so that heaviers leave the central bottom orifice and lighters reverse their helical path along a curved plane to leave from the top. The difference of one specific gravity unit between coal and clay permits the coal to leave through the top after flow reverses and permits the coal of 1.6 specific gravity to be very quickly and efficiently withdrawn from the clay which leaves through the bottom orifice. Due to the requirements of high separation efficiency at large tonnage throughout, the inlet pipe generally has a greater diameter than the bowl width and a mushrooming effect results from this disparity between inlet pipe and bowl width. It has been found that a different type of flat deflector is needed for smaller cyclones, e.g., inner cyclone diameters equal to or less than 20 inches than for larger cyclones, e.g., inner cyclone diameters equal to or more than 20 inches, and the preferred examples are deflector 68A in FIG. 3 for small cyclones and deflector 68B in FIG. 4 for larger cyclones.

Figure 2A:
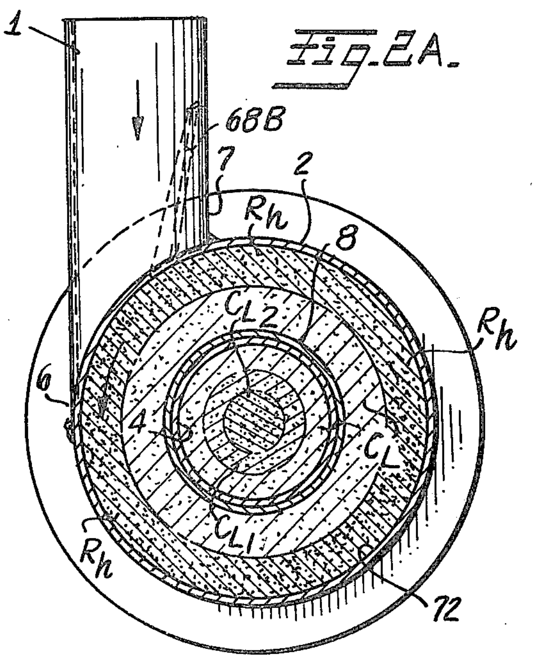
FIG. 2A is a sectional view along line 2A—2A of FIG. 2 and is similar to FIG. 1A.

A front view of the centrifugal cyclone 19 fitted with deflector 68B in FIG. 2 which is of generally the same flat type shown in FIG. 1 and can be used in multistage washing operations as with cyclone 38 or 41 which is shown in FIG. 8. In FIG. 2 the inner parts are shown in dotted lines, and the vertical stratified layers 69, 70 and 71 are shown by cross hatched shading. In FIG. 2A the top cross sectional view at line 2A—2A of FIG. 2 illustrates the initial formation of the vertical stratified heavy and light layers 70 and 71 at the very first helical turn under centrifugal action as a result of streamline flow imparted by the deflector 68B.

Figure 2B:
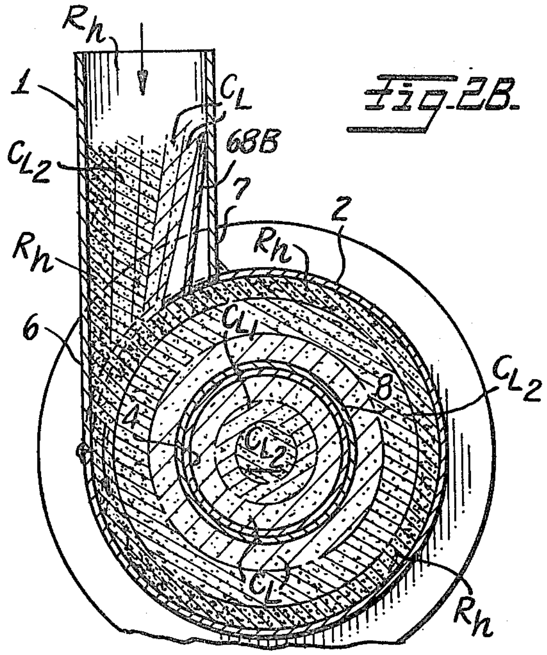
FIG. 2B is a sectional view along line 2B—2B of FIG. 2 and is similar to FIG. 1B.
Figure 2C:
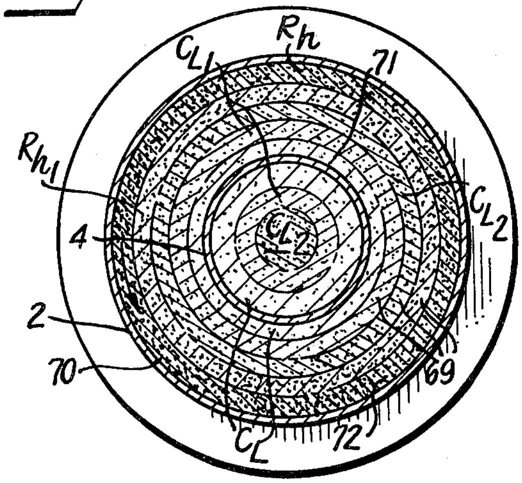
FIG. 2C is a lower sectional view along line 2C—2C of FIG. 2 is similar to FIG. 1C.

In FIG. 2B the top cross sectional view at line 2B—2B of FIG. 2 illustrates the unique trapezoidal bevelled triangular streamline flow deflector 68B which is the critical element of the invention used in the inlet feed pipe 1 of centrifugal cyclones 19, 38 or in 41 whose inner diameter is equal to or larger than 20 inches. The remaining figures of FIGS. 2C and 2D can be related to the corresponding figures of FIG. 1 for the trapezoidal rather than spherical triangle deflector.

Figure 3E:
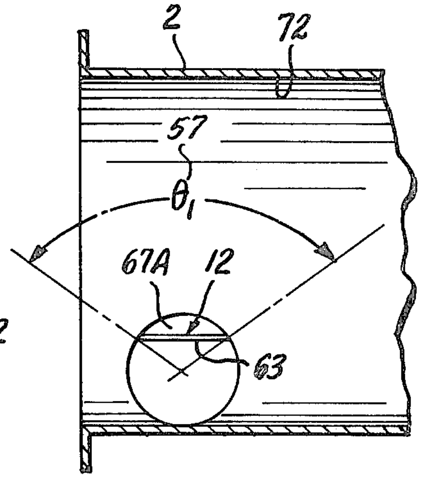
FIG. 3E is a side sectional view showing placement of the deflector of FIG. 3 in an inlet pipe and showing the critical center angle $\theta_1$.
Figure 3A:
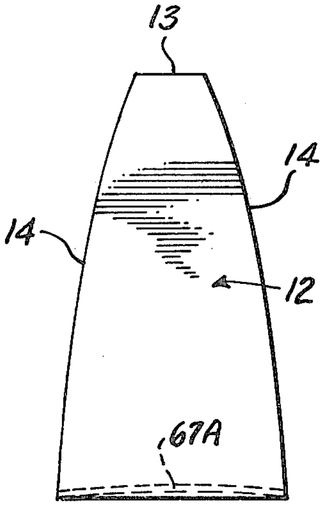
FIG. 3A is a plan view of a truncated spherical triangle deflector which is a first embodiment of the invention used in centrifugal cyclone diameters 20 inches or less.
Figure 3B:
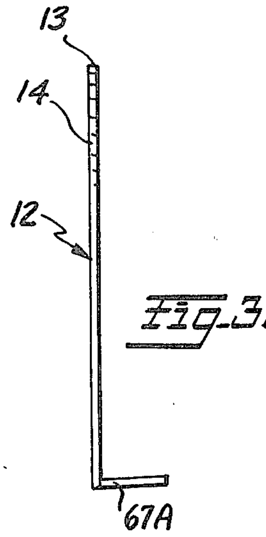
FIG. 3B is a side view of the embodiment of FIG. 3A showing the flat deflection surface and straight cap.
Figure 3C:
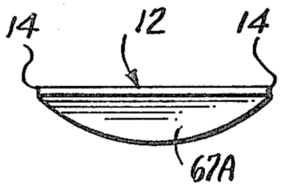
FIG. 3C is an end view of the embodiment of FIG. 3A.
Figure 4A:
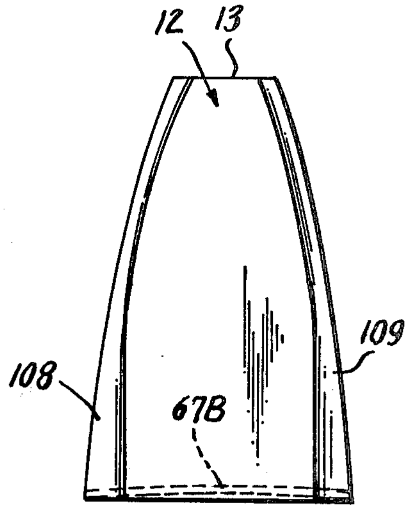
FIG. 4A is a side view of the deflector embodiment consisting of a trapezoidally shaped bevelled triangle which is a second embodiment used in centrifugal cyclone diameters of 20 inches or more.

The trapezoidal bevelled sides 108 and 109 of FIG. 4A help eliminate the top and bottom mushrooming flow created at the entrance into the cyclone bowl 2 of centrifugal cyclones larger than 20 inches, thereby preserving laminar flow. The deflector 68B as well as deflector 68A also provide a different type of adjustment which is essential to achieve high recovery rates in the cyclones of all diameters. The critical angles which are created by the deflector 68A (FIG. 1) or 68B (FIG. 2) of the invention are best understood by referring to FIG. 3 for the spherical triangle embodiment of deflector 68A and FIG. 4 for the truncated trapezoidal triangle embodiment of deflector 68B.

(B) CRITICAL ANGLE PARAMETERS OF THE INLET DEFLECTORS 68A AND 68B SHOWN IN FIGS. 3 AND 4

1. CENTER ANGLE, DEFLECTION ANGLE AND INCLUDED ANGLE

There are three critical angles which uniquely determine the deflector performance and are shown in FIG. 3 and in FIG. 4:

(1) the center angle 57 which is the angle made by the cap in relationship to the center of the inlet feed pipe of the cyclone;

(2) the deflection angle 56 which is the angle made by the deflector in relationship to the non-tangential feed pipe wall of the cyclone; and (3) the included angle 107, determined by the intersection of the bowl radius projection with the inner end of the flat deflection surface of body 12.

The ranges of these angles are 116° to 148°, 8° to 12°, and 120° to 170°, respectively.

FIG. 3A shows in plan view the truncated spherical triangular streamline flow deflector 68A with generally flat body 12, the arcuation sides 14, and apex 13. This is the deflection surface deflecting the pulp slurry entering cyclone bowl 2.

FIG. 3B shows a side of deflector 68A illustrating cap 67A. FIG. 3C shows an end of the truncated spherical triangular streamline flow deflector 68A and cap 67A.

FIG. 3D is a top cross section intersecting the cyclone bowl 2 at the inlet feed pipe 1 horizontal diameter elevation to exemplify the critical deflection angle 56 and the critical included angle 107. FIG. 3E is a front cross sectional view intersecting the cyclone bowl 2 at its diameter with the vortex finder box 4 and 8 removed for clarity. FIG. 3E illustrates the critical center angle 57.

The center angle 57 controls the desired degree of choking of incoming pulp flow at high velocity to maintain the pumped velocity at the cyclone inlet without introducing any turbulence at the start or the end of the flattened throttling surface of the deflector.

The reduction in the inlet area is from 19% to 32%, as a direct consequence of a center angle of 116° to 148°. The smaller angle is preferred for higher velocities and higher bowl widths 62 of the cyclone. Larger angles are desirable where higher density ores are separated in the cyclone, ores having a specific gravity higher than 1.6 and also for narrow cyclone bowl widths 62.

The function of the deflection angle 57 is to place the heavy particles, the intermediate particles and the light particles, all of the particles at the outer wall 72 of the cyclone at the first entry of the pulp into the bowl 2 without any mushrooming or turbulence over a wide range of velocities of incoming flow. This deflection angle 57 which lies within a very narrow range of only 4° has demonstrated a narrow criticality which functions without fault over a surprisingly broad range of cyclone velocities, varying from about 8 feet per second to about 28 feet per second.

2. SINGLE SETTING FOR 90 to 98% BASED ON WASHABILITY TEST

The surprising result is the substantial elimination of turbulence throughout the velocity range at substantially one setting.

To contrast the function of relative breadth of center angle range to the narrowness of deflection angle range, one must bear in mind that the center angle of the deflector operates as a transmitter surface to fan out the pulp flow in a wide swath toward the outer or tangential wall of the cyclone while the deflection angle is to fine tune the incoming velocity and quantity of pulp to a gradually streamlined flow pattern for pinpointing the placement of all particles on the tangential wall of the cyclone.

The included angle 107 expresses in solid geometry terms, e.g., in three dimensions, the relative displacement of the inlet pipe from its normal perpendicular direction to the cyclone bowl to an oblique direction. This departure from the perpendicular results in a narrowing of the flow of pulp from the inlet into the cyclone bowl and effectively throws all of the particles in the pulp toward the tangential wall at the expense of the quantity of pulp which flows at such an oblique axis into the bowl. Thus this included angle of between 120° and 170° represents a relatively narrow range of obliquity which is permitted. Thus, the first two of the critical angles apply to the case in which the inlet pipe comes into the cyclone at a normal axis following standard cyclone manufacturing practice and the third of the critical angles takes care of the unusual cyclone designs which depart from standard practice and bring the inlet pipe into the cyclone at an oblique angle or under a symmetrical or assymetrical construction from the usual circular inlet pipe cross section.

3. METHOD OF MANUFACTURING AND INSTALLING INLET LINE DEFLECTOR AT CRITICAL ANGLES SHOWN IN VARIOUS VIEWS OF FIGS. 3, 4, 5 and 6

The process for the manufacture of a generally flat triangular shaped deflector and installation thereof in the interior non-tangential surface of the inlet pipe to feed the bowl of a centrifugal separating cyclone is shown in FIGS. 3, 4, 5 and 6. The deflector 68A in FIGS. 1A and 1B comprises body 12 which constricts the inlet cross section to the bowl from 19% to 32% of the inlet pipe total cross section. The deflection surface body 12 is defined by three critical angles, $\theta_1$, $\theta_2$, $\theta_3$, as follows:

(1) $\theta_1$ is the center sector angle shown in FIG. 3E which encompasses the chord made by the bottom edge of the deflector body 12 at the cross section of the inlet pipe at the inlet end of the deflector body 12, (2) $\theta_2$ is the deflection angle shown in FIG. 3D constituting the angular deflection of body 12 relative to the inlet pipe axis, and (3) $\theta_3$ is the included angle shown in FIG. 3D determined by the intersection of the bowl radius projection with the inner end of the flat deflection surface of body 12.

These three critical angles indicate direction of laminar flow which is created by said deflection surface.

The following are the steps of the manufacture and installation method illustrated in FIGS. 5 and 6:

(a) As shown in FIGS. 5A and 5B, the first step is selecting a pipe section 78 of the same size as the inlet pipe which provides the essential environment for introducing the sheet for the pattern 77 and marking off on the edge of the pipe section the ends of a chord 63 such that the portion of the pipe circumference enclosed by chord 63 is equal in degrees to a preselected center angle varying between 118° and 149° (the optimum angle being about 120° for a six inch pipe, and higher angles for higher diameter pipes). The end locations of the chord 63 are marked on a full pipe section or a half pipe section as shown in FIGS. 5B and 5E.

(b) The next step is the measuring with protractor 80. The body length to the apex of the deflector body and the width of the base (equal to chord 63) of the deflector are marked onto a template material as a guide during the trimming of the template as shown in FIGS. 5B, 5C, 5D and 5E. The protractor setting shown in FIG. 5C gives the required apex height which can then be transferred to the template as shown in FIG. 5D. The chord 63 dimension can be obtained by holding the edge of the template material against the end of the pipe at the chord markings.

(c) After marking the pattern base and the apex, the next step is cutting the pattern to form the bottom dimension of the template at the base to meet the width marking at the pipe edge and thereby form the chord while cutting in oversize manner the generally triangular sides to extend to a point slightly beyond the apex, reference being made to FIGS. 5D and 5E.

(d) A further trimming of the template apex short of the top corner of the triangle is carried out to form a short straight line parallel to the straight line base, reference being made to FIG. 5E.

(e) After trimming the apex, the two sides are then cut to form arcuate sides shown for the pattern in FIG. 5E.

(f) Then, following the illustration of FIG. 5F, the pattern is used for cutting an abrasion resistant, corrosion resistant, easily weldable ferrous metal sheet to form apex 13, base 15, and arcuate sides 14 of body 12.

(g) The last step is installing the cut and trimmed ferrous metal sheet in the flat deflector shape of body 12 by welding its side edges and apex to the pipe as shown by the weld lines in FIGS. 6A and 6B.

Figure 4B:
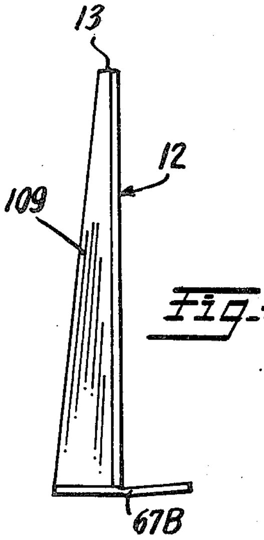
FIG. 4B is a side view of the embodiment of FIG. 4A.
Figure 4C:
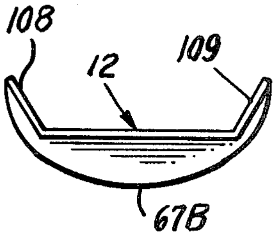
FIG. 4C is an end view of the embodiment of FIG. 4A.

As shown in FIGS. 4A, 4B and 4C, the arcuate side edges of the deflector body 12 may be bevelled. The arcuate bevelled sides 108 and 109 are contiguous with the arcuate left and right edges respectively of body 12 as shown in FIG. 4A.

A cap 67B may be attached at the base of body 12, as shown in FIGS. 4A, 4B and 4C, with the cap closing the bottom edge space between the deflector body 12 and the cyclone bowl wall 71. See FIG. 4E for this closing relationship of cap 67B.

The cap 67B is secured by full penetration welding.

In the non-bevelled arcuate side embodiment shown in FIGS. 3A, 3B and 3C, a cap 67A is attached by welding to provide the capped embodiment of the deflector body without bevelled arcuate side edges. The edges are secured by full penetration welding.

(C) CRITICALITY OF FLAT DEFLECTOR SURFACE AND EFFECT OF CYCLONE SIZE (TABLE 1)

Figure 7:
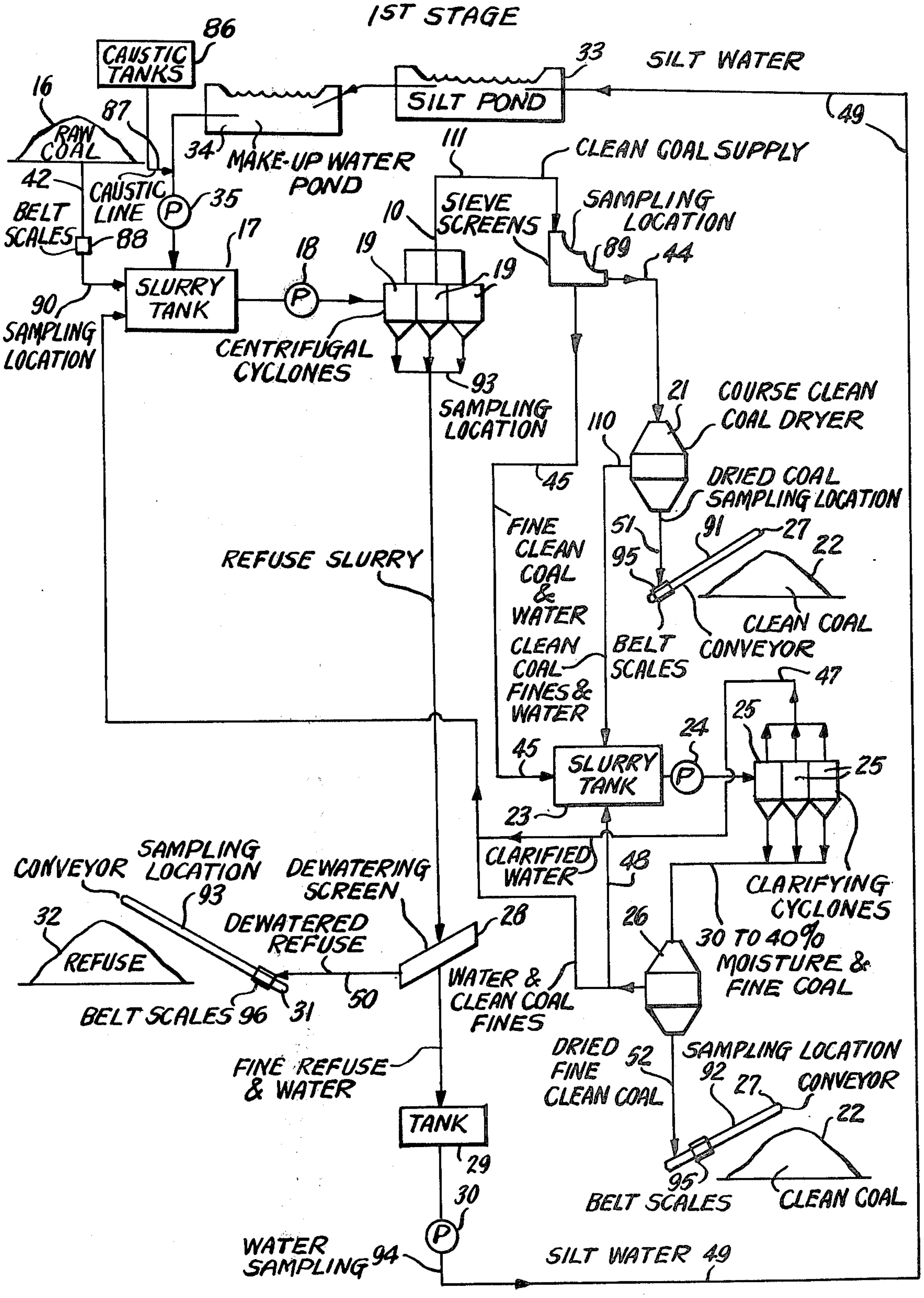
FIG. 7 is a flow diagram of a single stage coal washing plant using the inlet line deflector of the invention.

It is a critical aspect of the triangular deflector 68A or 68B of the invention that the body 12 of the deflector is generally flat to impart a sudden thrust to the incoming pulp feed in the inlet pipe 1 from the cyclone pump, typically shown as pump 18 in the single stage washing shown in FIGS. 7 or 8 of my parent application Ser. No. 860,330 or in the multistage washing using pump 38 in FIG. 8 thereof.

A curved body which could be formed by mounting a curved part, e.g., an arc portion of a pipe of smaller diameter with the arc in convex relation to the larger inlet pipe and thereby to cut down the cross-sectional area by 20% to 30%, is not satisfactory. The indented cusp intersection so formed where the arcuate insert meets the wall of the pipe causes drag in the valleys and creates eddy currents without realizing the essential sharp thrust to the entire flow cross-section as the flow comes into the deflection zone. It is essential that the thrust be imparted by a generally flat surface.

Also, if a curved body not generally flat of an arc cut from a pipe of larger diameter is inserted there is then no sharp thrust. A transition in the inner wall at the deflection zone must occur. A generally curved circular section changes to a flat surface. An instant change in flow results to impart a thrust affecting movement of all particles to the inner wall of the cyclone bowl. Curved inserts have been tried but only generally flat deflectors have been successful. The applicability of the generally flat deflector to cyclones of different sizes is shown in Table 1 which follows and which illustrates the production advantages in tons per hour in column 9, cost advantages in capital investment in column 10, cyclone dimensions in columns 1, 2 and 8, the bottom orifice dimensions in column 7 and the vortex finder adjustments and dimensions in columns 4 and 6. The control of these variables to achieve efficiencies of 95% to 99% in washing coal is the subject of my copending application #3, which is cross referenced herein. In the fixing of the critical angle parameters of the deflection surface in relation to cyclone size and which are shown in Table 1, particular importance is placed on requiring the inlet pipe diameter to be larger than the diameter of the bottom orifice, both in respect to the principle of operation and to the results obtained by cyclone machines modified by the invention.

In Table 1 at column 4 the vortex finder diameter (inside diameter) is set to produce about 70% recovery of lights for a two stage plant, the remainder constituting heavies or refuse leaving the bottom orifice. The 70% value may be fine tuned by 15%+ or 15%−, e.g., up to 85% or down to 55%. Accordingly, for each ton input in continuous operation the 4th column of Table 1 sets 0.7 tons output as lights and 0.3 tons output as heavies out of the bottom. To bring the lights output value up we decrease the bottom orifice diameter towards the minimum value shown in column 7. This inter-relationship to outlet orifice for all cyclone sizes is claimed in my application π3.

In columns 10 and 11, the economic data are provided for cyclone selection. Whether to install a large number of cyclones of small size or a few cyclones of larger size can be more easily ascertained. With the present invention installed in an 18 inch, 3 cyclone plant, the cost of the plant is recovered in 9 months of two shifts per day operation.

TABLE 1

CRITICALITY OF FLAT DEFLECTOR SURFACE AND EFFECT OF CYCLONE SIZE

Pressure 10 to 35 psi; Fluid Velocity 8 to 28 FPS % Solids 20 to 50

| Dish (82) height in inches | Bowl 2 Dia size in inches | Inlet feed pipe 1 Inside Dia. | Vortex Finder box 4 Inside Dia | Width of bowl 62 in inches | 83 Vortex Finder box 4 length in inches | Bottom Orifice 3 Dia limits in inches | Inside Height of Cyclone bowl 2 in inches | Capacity in TPH | 1973 Estimated Cost 126.19 per inch of Dia. |
|---|---|---|---|---|---|---|---|---|---|
| 3.264 | 10 | 3.068 | 4.026 | 2.987 | 7.847 | 0.972 to 2.222 | 12.222 | 16 to 44 | 1261.91 |
| 3.917 | 12 | 4.026 | 5.047 | 3.188 | 9.417 | 1.167 to 2.667 | 14.667 | 22 to 62 | 1514.29 |
| 4.569 | 14 | 4.313 | 6.065 | 3.250 | 10.986 | 1.361 to 3.111 | 17.111 | 25 to 70 | 1766.67 |
| 5.222 | 16 | 4.563 | 7.187 | 3.188 | 12.556 | 1.556 to 3.556 | 19.556 | 28 to 79 | 2019.05 |
| 5.875 | 18 | 6.000 | 7.875 | 4.375 | 14.125 | 1.750 to 4.000 | 22.000 | 50 to 135 | 2271.43 |
| 6.528 | 20 | 6.813 | 7.875 | 4.375 | 15.694 | 1.750 to 4.000 | 24.444 | 64 to 176 | 2523.81 |
| 7.181 | 22 | 7.437 | 7.981 | 5.813 | 17.264 | 1.750 to 4.000 | 26.889 | 77 to 210 | 2776.20 |
| 7.333 | 24 | 7.981 | 10.020 | 5.937 | 18.833 | 2.333 to 5.333 | 29.333 | 88 to 242 | 3028.58 |
| 11.750 | 36 | 11.938 | 15.000 | 9.250 | 28.250 | 3.500 to 8.000 | 44.000 | 198 to 541 | 4542.87 |
| 13.056 | 40 | 13.124 | 16.876 | 10.250 | 31.389 | 3.889 to 8.889 | 48.889 | 239 to 654 | 5047.63 |
| 15.667 | 48 | 16.500 | 20.250 | 12.000 | 37.667 | 4.667 to 10.667 | 58.667 | 378 to 1033 | 6057.15 |

(D) CENTER ANGLE VARIATION REDUCTION IN FLOW AND AREA OF INLET PIPE TO CYCLONE (TABLE 2)

As mentioned above under Section B dealing with the critical angle parameter of the generally flat triangular deflectors 68A or 68B this parameter affects the velocity of the initial thrust of all the particles in the deflection zone more than the other two parameters. The deflection angle together with the included angle control the direction of the thrust of the particles in the deflection zone of the inlet pipe. With these factors in mind, the optimum center angles are shown in Table 2 below and column 1 creates the optimum center angle to the area of reduction in column 2, area of flow in column 3 and percentage area reduction in the inlet pipe in an 18 inch centrifugal cyclone fitted with an inlet pipe with a 6 inch diameter.

The center angle increases in larger cyclones. For example, a 48 inch cyclone will have an optimum center angle of about 125° to 135° for recovery of at least about 70% of washed coal from the cyclone, the recovery based on that predicted by the specific gravity washability test disclosed in my copending patent application case No. 2 and cross referenced below.

The center angle in a 20 inch cyclone may be increased from 120° up to 140° to make a lower recovery in speeded up multiple stage washing operations and recovery of at least 50% up to 90% may be achieved by this speeded up method of multiple washing either in series or in parallel.

TABLE 2

CENTER ANGLE VARIATION REDUCTION IN FLOW AND AREA OF INLET PIPE TO CYCLONE

| Center angle | Area of reduction | Area of Flow | % Area Reduction of Inlet pipe |
|---|---|---|---|
| 118 | 5.2947 | 22.9796 | 18.73 |
| 119 | 5.4108 | 22.8635 | 19.14 |
| 120 | 5.5278 | 22.7465 | 19.55 |
| 121 | 5.6457 | 22.6286 | 19.97 |
| 122 | 5.7654 | 22.5089 | 20.39 |
| 123 | 5.8860 | 22.3883 | 20.82 |
| 124 | 6.0084 | 22.2159 | 21.25 |
| 125 | 6.1308 | 22.1435 | 21.68 |
| 126 | 6.2550 | 22.0193 | 22.12 |
| 117 | 5.1795 | 23.0948 | 18.32 |
| 116 | 5.0661 | 23.2082 | 17.92 |
| 127 | 6.3810 | 21.8933 | 22.57 |
| 128 | 6.5070 | 21.7673 | 23.01 |
| 129 | 6.6348 | 21.6395 | 23.47 |
| 130 | 6.7626 | 21.5117 | 23.92 |
| 131 | 6.8922 | 21.3821 | 24.38 |
| 132 | 7.0227 | 21.2516 | 24.84 |
| 133 | 7.1550 | 21.1193 | 25.31 |
| 134 | 7.2873 | 20.9870 | 25.77 |
| 135 | 7.4205 | 20.8538 | 26.24 |
| 136 | 7.5555 | 20.7188 | 26.72 |
| 137 | 7.6905 | 20.5838 | 27.20 |
| 138 | 7.8273 | 20.4470 | 27.68 |
| 139 | 7.9650 | 20.3093 | 28.17 |
| 140 | 8.1027 | 20.1716 | 28.66 |
| 141 | 8.2422 | 20.0321 | 29.15 |
| 142 | 8.3817 | 19.8926 | 29.64 |
| 143 | 8.5230 | 19.7513 | 30.14 |
| 144 | 8.6643 | 19.6100 | 30.64 |
| 145 | 8.8074 | 19.4669 | 31.15 |
| 151 | 9.6777 | 18.5966 | 34.23 |

(E) OPERATION OF A SINGLE STAGE HYDROCYCLONE COAL WASHING PLANT

The following description of FIG. 7 shows an embodiment of the invention employing three 18 inch cyclones 19, in parallel, capable of preparing upwards of 150 tons per hour at 98% recovery based on washability testing as shown in my copending patent application case No. 2.

Raw coal is mined from a strip or deep mine and delivered to the cleaning plant where it is crushed and sized to $\frac{3}{4}\times0$ product designated as raw coal pile 16.

The $\frac{3}{4}\times0$ raw coal is fed into the first stage slurry tank 17 by means of the raw coal conveyor 42 after passing over the raw coal belt scales 88. The scales 88 weigh the feed, thus establishing the tons per hour being fed to the washing plant.

At the same time the $\frac{3}{4}\times0$ raw coal is being fed to the slurry tank 17, make up water is pumping into the tank 17 from the make up water pond 34 to make a predetermined pulp slurry having a known percent solids content.

Liquid caustic (50% solution of sodium hydroxide) 86 is metered into the make up water line before the make up water pump 35 to set the pH at the desired level for the coal being processed to yield a silt water 49 at a pH of about 6.0 to about 7.0. This silt water pH level is necessary to insure minimal corrosive action to the plant interior parts.

It is a novel and patentable aspect of the invention to add quick dissolving liquid caustic to the make up water line into the make up water pump 35 whereby the pH of the water charged to the washing system so that the water leaving the system going to silt pond 33 will be at substantial neutrality, e.g., a pH of about 6.0 to about 7.0, thereby assuring the elimination of developing acidity as the solids are processed in the plant. It is a characteristic of many coals in the eastern part of the United States to develop high acidity and exhibit low pH, e.g., a pH of 3 to 5. The so called "acid waters" in the Appalachian mountains are a part of American folklore.

These acid waters encountered in washing corrode the low carbon steel used in manufacturing the cyclone 18 as well as the box 8, vortex finder 4, and especially the sloping bottom and bottom orifice 3 which are subjected to maximum abrasive wear by wet hard shale, rock, and siliceous refuse, etc. in the heavy fractions.

The selection of mild steel for improved corrosion service in fabricating the cyclone parts is not of any significant advantage in comparison with the need for silt water acidity control in accordance with the invention. It must be recognized that the invention reduces corrosion by eliminating turbulent flow which causes corrosion while simultaneously controlling acidity which accelerates corrosion.

The first stage pulp slurry of from 18% to 50% solids is pumped by the first stage pump 18 to the distributor manifold 9 where it is equally proportioned to each first stage centrifugal cyclone 19 under appropriate constant pumping pressure which may vary from 10 psi up to 35 psi. Optimum pressures are from about 18 to 24 psi.

The bunched first stage centrifugal cyclones 19 classify the slurry by specific gravity into two slurries: the light 1.5 specific gravity float particles, referred to as clean coal slurry, and the heavy 1.5 specific gravity sink particles referred to as the refuse slurry. The 1.5 specific gravity plant setting is determined from the clean coal quality and percent recovery as calculated from the lab analysis of the clean coal product sampled off of the clean coal belt 27 at location 91 and the weight recorded by the clean coal belt scales 95.

The bunch of cyclones 19 provides a battery especially adapted for single stage washing of $\frac{3}{4}\times0$ lignite to provide coal for gasification and making steam.

The lab analysis and the percent recovery is compared to a laboratory washability analysis as explained in my copending patent application case No. 2, thus determining the plant efficiency as a percentage of clean coal based on the washability test.

The clean coal slurry is delivered via the clean coal exit pipe 10 to the sieve screens 20 where a large portion of the water and some of the clean coal fines are separated from the larger clean coal particles.

Sampling location 89 at each of the dewatering sieve screens 20 provides clean coal quality information for each individual cyclone. This information is required to determine the necessary changes in settings 83 of the vortex and its relation to the orifice 3. Changes in these settings 83 and 3 are described in my copending patent application case No. 3. Also refer to FIGS. 1 and 2 in this application for the 18 inch cyclone setting.

The larger clean coal fraction is delivered to the coarse clean coal dryer 21 which is a conventional machine shown in the Riegel text entitled *Chemical Machinery* (Reinhold Publishing Corporation: New York, N.Y., 1944), page 30. The product is centrifugally spun dried in this machine to less than 8% moisture and placed on the clean coal conveyor belt 27 along with the fine clean coal product from the fine clean coal centrifugal dryer 26.

The water and clean coal fines from the coarse clean coal dryer 21 is delivered to the fine clean coal slurry tank 23 where the water and fine clean coal from the sieve screens 20 are delivered to make up the fresh fine clean coal charge.

The slurry pump 24 pumps the fine clean coal slurry to the clarifying cyclones 25 where the slurry is split into two fractions: the clarified water 47 and the high solids fine clean coal slurry 55.

The clarified water 47 is piped back to the raw coal slurry tank 17. The high solids fine clean coal slurry 55 is delivered to the fine clean coal dryer 26 where the clean coal product is dried to approximately 12 to 16 percent moisture, sampled at location 92, and then placed on the clean coal conveyor belt 27 along with the dried coarse clean coal to yield a composite clean coal product of 8% moisture or less.

The small fraction of clean coal fines that escaped through the fine clean coal centrifugal dryer 26 and the water are delivered back to the fine clean coal slurry tank 23 to be mixed with the fine clean coal fines from the sieve screens 20 and the coarse clean coal dryer 21.

The composite clean coal product is sampled and weighed at location 91.

The refuse slurry from each centrifugal cyclone 19 is sampled and delivered to the refuse dewatering screen 28 where the refuse is split into two fractions: the dewatered coarse refuse 50, and the fine refuse and water referred to as silt water 49.

The coarse refuse is conveyed, sampled at location 93, and weighed by the refuse scales 96 on the refuse conveyor 31. Refuse conveyor 31 is a conventional machine and is shown at page 79 of the text by Riegel entitled *Chemical Machinery* (Reinhold, 1944). The refuse pile 32 is then disposed of either by hauling or conveying back to the mined area or in some situations the refuse has a salable value and can be marketed.

The silt water 49 is delivered to the silt water slurry tank 29, pumped by the silt water pump 30 to the silt water settling pond 33 and sampled at location 94 to monitor the silt water pH value. The silt settles out and the clear water decants into the make up water pond 34 from which the make up water pump 35 draws.

(1) Conservation of Pump Energy

The conservation of this imparted energy by proper positioning of the equalizers 100 and 105, diverters 104, and the deflector 68A and 68B, as shown in FIGS. 1A, 1B, 2A and 2B, prior to the entrance into the cyclone bowl 2 permits the attainment of maximum velocity and pressure available from the pump 18 into the coal washing system. This energy is vitally necessary to create the laminar super gravity liquid separation forces required for the separation of suspended particles in water by specific gravity or weight alone rather than by size separation.

(2) Contamination of Clean Coal

Due to the critical deflection surface 68A or 68B in the inlet pipe there is an avoidance of contamination in the light fraction by floc or slimes mentioned in Visman, U.S. Pat. No. 3,353,673, column 1, line 58. Horizontal layers are shown in Visman's drawing. The slimes or floc are generally impure. The fine particles of impure siliceous appear in the clean coal slurry after separation and thus contaminate the fine clean coal circuit. The fine clean coal circuit is typically exemplified by connecting circuit lines 45 and 48 in FIG. 7 and by these numbered lines in a multistage plant in FIG. 8.

In the separated vertical layers described in FIG. 1 and FIG. 2, the particles are displaced by specific gravity or particle weight rather than by particle dimension or size, as is a problem encountered in Visman's horizontal layers. In contrast as shown in FIG. 1 and FIG. 2 herein the fine clean coal particles are combined at the outer wall of vortex finder 4 in the vertical layer which is identified as light specific gravity layer 71. The heavy specific gravity fines are displaced and move outwardly centrifugally to report to the heavy specific gravity layer 70.

Streamline flow creates layer formation in the vertical plane by avoiding and actively preventing the incorrect placement of the inlet flow in the accelerated mode, by higher velocity due to cross-section area constriction.

Flow reversal requires adequate height measured from length 83 of the vortex finder in order for lighter particles in layer 71 to enter the interior of the vortex finder 4. Obviously this height could change if the cyclone bowl width 62 changes and if a different slope or concavity at the bottom dish 82 is used.

EXAMPLES

The examples which are set forth below illustrate the unexpected results achieved in converting refuse discarded from earlier coal washing into valuable coal for the steam generation market, coal which must bring down the mineral ash content to below 14% and raise the BTU content per pound to 12,000 BTU or more at low sulfur. These tests for ash, sulfur, BTU per pound, Free Swelling Index (cokability for metallurgical coal), M and A Free BTU (moistures and ash free BTU per pound) are all standard ASTM tests for bituminous coal used throughout the utility and steam generator industry.

(A) Apparatus Employed in Examples

The following examples 1, 2, 3, and 4 illustrate the operation of an 18 inch centrifugal cyclone which is the structure shown in FIG. 1 with the cyclone circumference 18⅛ inches measured at its inner diameter, the height of the cyclone being 22 inches, and the bottom orifice diameter being less than the inner diameter of the inlet pipe and lying between 3½ inches and 4⅞ inches. The 6 inch inlet pipe fixes a relationship between the inner diameter of the inlet pipe and the diameter of the bottom orifice, the former being always greater than the latter. Adjustment of the ratio of the inlet pipe diameter and the bottom orifice diameter is simply accomplished by using smaller diameters for the bottom orifice in order to achieve predetermined recovery of washed coal. In this connection, note from Table 1 herein that differing cyclone sizes are used and the structural dimensions of inlet feed pipe vortex finder, bowl width, height, etc., are as shown in Table 1. Further note the relationship of inlet pipe diameter to vortex finder which can be derived from columns 3 and 7 of Table 1. However, the details of these ratios and the adjustment for improving recovery of washed coal are the subject matter of my application 190 3.

(B) Illustration of Effect of Deflector

Example 1 and Table 1 disclose the washing of coal #1 which is $\frac{3}{4}\times 0$ crushed WSR Bone Pile Shaker Coal in the above described centrifugal cyclone but without the insertion of the deflector 68A in the critical angle relationship shown in FIGS. 1 and 3. WSR Bone Pile is a refuse recovered from earlier washing and has value only as crushed rock fill, $5.00 per ton.

Example 2 is identical in every respect to Example 1 except that deflector 68A is installed as shown in FIG. 1. The differences in operation can be seen in Table 2 for Coal #1 which summarizes the same data presented in Table 1.

Maryland, from a coal pile fill at an abandoned railroad bridge near Georges Creek. The coal was believed to be about 100 years old and taken from the Pittsburgh seam. National Geographic Magazine, at Volume 149, Issue No. 6, June 1976, featured an article on this mine which is believed to be the first mine in the United States. This Pittsburgh seam is very high quality coal low in ash and low in sulfur. Because of the low sulfur it does not undergo spontaneous combustion in gob piles as many high sulfur gob piles do in the Eastern coal fields.

The rate of pumping through the cyclone is 45 tons per hour. The coal slurry pumped into the inlet without a deflector 68A is at about 18 feet per second. The vortex finder adjustment in each cyclone is at about 11 inches.

The first stage of the coal washing plant of FIG. 8 embodies cyclones 1, 2, and 3 with the height of the vortex finder at the precise height shown. The settings of vortex height in relation to the bottom orifice diameter fixes a recovery of 1.75 lights at 70% for the two stage plant output.

The mineral ash content dropped from 30.81% to 18.86% which makes the product wholly unsatisfactory for the steam market, which must be less than 14%.

The BTU per pound was raised from 10,150 to 12,309 which shows that the high mineral ash after conventional washing frustrates recovery of a low quality steam grade coal. This coal could be useful in the present energy crisis if the ash, only, were removed.

Table 1

Coal #1 Without Deflector 68A

| Product Name WSR Bone Pile Shaker Coal Sample I.D. | Analysis Dry basis % Ash | % Sulphur | BTU per pound | M&A Free BTU | FSL coke button | Vortex Finder depth | Bottom orifice diameter | Tons Per Hour | Theoretical % Recovery based on washability Test | Plant % Recovery | Plant % Efficiency based on washability Test |
|---|---|---|---|---|---|---|---|---|---|---|---|
| Raw Coal | 30.81 | 0.71 | 10150 | 14670 | 1 | | | 135. | | | |
| Clean Coal | 18.86 | 0.62 | 12309 | 15170 | 1 | | | 83 | 67.70 | 61.22 | 90.43 |
| Refuse | 50.24 | 0.58 | 7108 | 14285 | 0 | | | 52 | 32.30 | 38.78 | |
| Centrifugal 1 Cyclone | 16.17 | 0.61 | | | | $10\frac{3}{4}$ | $4\frac{7}{8}$ | | | | |
| Cyclone 2 | 15.00 | 0.75 | | | | 11 | $4\frac{1}{4}$ | | | | |
| Cyclone 3 | 16.22 | 0.72 | | | | 11 | $4\frac{1}{4}$ | | | | |
| Cyclone 4 | 15.13 | 0.76 | | | | $10\frac{3}{4}$ | $4\frac{1}{4}$ | | | | |
| Cyclone 5 | 18.39 | 0.73 | | | | $10\frac{3}{4}$ | $4\frac{1}{4}$ | | | | |

Example 3 is comparable to Example 1 in that it discloses washing without the deflector 68A and illustrates the washing in a centrifugal cyclone using another coal sample, namely raw crushed $\frac{3}{4}\times 0$ coal from Sun Bone Pile separated from Breaker. This raw crushed coal is a separated refuse from an earlier washing operation and was regarded as having no commercial value for its coal content and deemed unsuitable for commercial washing.

Example 4 is the same as Example 3 except that, like Example 3, it uses deflector 68A as mounted in FIG. 1 of the application, and demonstrates the result achieved after the deflector 68A is installed with the bottom orifice diameter being less than the inlet pipe diameter but at $3\frac{1}{2}$ inch instead of $4\frac{1}{4}$ inch diameter.

EXAMPLE 1

The 18 inch cyclone was fed a refuse grade coal, WSR Bone Shaker Pile, $\frac{3}{4}\times 0$, located at Georges Creek, Lonconing in Allegheny County, Western

EXAMPLE 2

This example is substantially identical to Example 1 but with deflector 68A installed, differences and the results are shown in Table 2.

Surprisingly, the mineral ash is reduced from 26.89% to 11.58%. This variation between 26.89% ash to 30.81% ash is an expected sampling range in grab samples from the pile. The ash content dropped to 11.58%.

The important comparison to Example 1 is in the percent of ash reduction, e.g., Example 1, 11.95% reduction and Example 3, 15.31% reduction, on a dry weight basis. As a direct result of the improved ash reduction, an improvement of 28%, the washed coal with a BTU value on a dry basis of 13,552 BTU per pound, by this example, fulfills the requirement for a high grade steam coal which commands a premium price in the present market over low grade steam coal, e.g., $24.00/ton as compared to $20.00/ton.

This example demonstrates reclamation of worthless fill or refuse and its conversion into high grade valuable commercial crushed coal product.

the steam market specification of less than 14%. The gravity value was set at a gravity of clean coal at 1.4 in contrast to 1.75 in Example 3.

Table 2

Coal #1
With Deflector 68A

| Product Name WSR Bone Pile Shaker Coal Sample I.D. | Analysis Dry Basis % Ash | % Sulphur | BTU per pound | M&A Free BTU | FSL coke button | Vortex Finder depth | Bottom orifice diameter | Tons Per Hour | Theoretical % Recovery based on wash ability Test | Plant % Recovery | Plant % Efficiency based on washability Test |
|---|---|---|---|---|---|---|---|---|---|---|---|
| Raw Coal | 26.89 | 0.70 | 10736 | 14685 | 1/2 | | | 130 | | | |
| Clean Coal | 11.58 | 0.73 | 13552 | 15327 | 4 | | | 86 | 67.70 | 66.21 | 97.80 |
| Refuse | 57.67 | 0.53 | 6136 | 14496 | 0 | | | 44 | 32.30 | 33.79 | |
| Centrifugal 1 Cyclone | 9.39 | | | | 4 1/2 | 10 3/4 | 3 3/4 | | | | |
| Cyclone 2 | 8.96 | | | | 3 1/2 | 11 | 3 1/2 | | | | |
| Cyclone 3 | 8.57 | | | | 4 1/2 | 11 | 3 3/4 | | | | |
| Cyclone 4 | 11.34 | | | | 3 1/2 | 10 3/4 | 3 5/8 | | | | |
| Cyclone 5 | 10.90 | | | | 3 | 10 3/4 | 3 3/4 | | | | |

EXAMPLE 3

This example and Table 3 are like Example 1 and illustrate the washing of another sample of coal, Sun Bone Pile from Breaker. The sample is a coal which is the high ash hard boney product from the coal breaker. There has long been a need to recover whatever coal can be saved from the high mineral ash bone coal from the breaker. The breaker piles are an eyesore in the mine area and have stimulated state, as well as Federal, legislation for their removal. The raw coal BTU is 11,037.

The same procedure and apparatus as in Example 1 was used and the vortex finder was set at a gravity recovery of lights of about 1.7 or slightly higher to achieve a recovery of 70%.

The recovered coal had an ash content of 22.26% and a BTU value of 11,825. The product was unsatisfactory as coal for the steam market.

The BTU value of coal washed by this Example is 13,642 to provide a high quality steam coal having a commercial value of $24.00/ton.

In comparison with a reduction in ash of 26.64% to 22.26% in Example 3, a 16.44% reduction, Example 4 provides a reduction of 25.81% to 11.24%, a 56.45% reduction.

It is surprising to find a reduction with the bone breaker coal 4 times as great with the invention than without.

More important, it is economically and ecologically gratifying to find high quality steam coal in refuse at a time when energy is critically short and its cost looms as the most disturbing challenge to the economic health of the nation.

The adjustments in Tables 3 and 4 illustrate that, by setting recovery at 70%, a different gravity value was made possible by deflector 68A in Example 4 that was not possible in Example 3.

Table 3

Coal #2
Without Deflector 68A

| Product Name Sun Bone Pile from Coal Sample I.D. | Analysis Dry Basis % Ash | % Sulphur | BTU per pound | M&A Free BTU | FSL coke button | Vortex Finder depth | Bottom orifice diameter | Ions Per Hour | Theoretical % Recovery based on washability Test | Plant % Recovery | Plant % Efficiency based on washability Test |
|---|---|---|---|---|---|---|---|---|---|---|---|
| Raw Coal | 26.64 | 2.64 | 11037 | 15045 | 6 1/2 | | | 130 | | | |
| Clean Coal | 22.26 | 2.29 | 11825 | 15211 | 9 | | | 92 | 23.26 | 70.65 | 303.74 |
| Refuse | 37.46 | 3.05 | 9207 | 14721 | 3 | | | 38 | 76.74 | 29.35 | |
| Centrifugal 1 Cyclone | | | | | | 13 3/16 | 4 1/4 | | | | |
| Cyclone 2 | | | | | | 13 3/16 | 4 1/4 | | | | |
| Cyclone 3 | | | | | | 13 3/16 | 4 1/4 | | | | |
| Cyclone 4 | | | | | | 13 3/16 | 4 1/4 | | | | |
| Cyclone 5 | | | | | | 13 3/16 | 4 1/4 | | | | |

EXAMPLE 4

The same coal pile was used as in Example 3, the grab sample showing an analysis of 25.81% mineral ash and BTU substantially the same as Example 3, e.g., 11.076 vs 11,037 for the raw coals.

By installing the deflector 68A in each of the 5 cyclones (see Table 4) the ash drops, surprisingly, from 25.81% to 11.24% which makes the coal conform with In terms of the recovery and efficiency figures in the laboratory gravity test run at normal gravity and explained in my application No. 2, cross referenced herein, Table 3 showed an efficiency based upon poor coal output, e.g., 3 times as much poor coal as turned out, rather than 100% good coal.

The efficiency in Table 4 is of good coal but, based upon washability at normal gravity, shows recovery substantially higher at the supergravity under high velocity forces between 18 to 20 feet per second in the cyclone bowl.

SEPARATION OF HEAVIER ORES SUCH AS GOLD AND SILVER

Obviously, the invention is also useful in separating heavy ores from lighter impurities as, for example, in the cyclone separation described in Grant, U.S. Pat. No. 2,082,157. In this case, the heavies are the purified fractions of gold and silver and the lights are the pulp slimes and silica impurities.

Table 4

Coal #2
With Deflector 68A

| Product Name Sun Bone Pile from Coal Sample I.D. | Analysis Dry Basis % Ash | % Sulphur | BTU per pound | M&A Free BTU | FSL coke button | Vortex Finder depth | Bottom orifice diameter | Tons per Hour | Theoretical % Recovery based on washability Test | Plant % Recovery | Plant Plant % Efficiency based on washability Test |
|---|---|---|---|---|---|---|---|---|---|---|---|
| Row Coal | 25.81 | 1.01 | 11076 | 14929 | 2 | | | 130 | | | |
| Clean Coal | 11.24 | 0.95 | 13642 | 15370 | 6 | | | 80.4 | 23.26 | 61.87 | 266 |
| Refuse | 49.60 | 0.91 | 7092 | 14071 | ½ | | | 49.6 | 76.74 | 38.13 | |
| Centrifugal 1 Cyclone | | | | | | 10¾ | 3¾ | | | | |
| Cyclone 2 | | | | | | 11 | 3½ | | | | |
| Cyclone 3 | | | | | | 11 | 3¾ | | | | |
| Cyclone 4 | | | | | | 10¾ | 3⅝ | | | | |
| Cyclone 5 | | | | | | 10¾ | 3¾ | | | | |

I claim:

1. A process for the manufacture of a generally flat triangularly shaped metal deflector and installation thereof in the interior non-tangential surface of an inlet pipe to the bowl of a centrifugal separating cyclone, said deflector constricting the inlet cross section at the inlet to the cyclone by about 19% to about 32% of the inlet pipe cross section, the flat deflection surface of the deflector being defined by three critical angles: (1) a center sector angle which encompasses the chord made by the bottom edge of the deflector at the cross section of the inlet pipe at the inlet end of the deflector, (2) a deflector angle constituting the angular deflection relative to the inlet pipe axis, and (3) an included angle determined by the intersection of the bowl radius projection with the inner end of the flat deflection surface, these three critical angles creating laminar flow and indicating direction of laminar flow, said process comprising the steps of:

(a) selecting a pipe section of the same size as the inlet pipe, measuring and marking on the edge of the pipe section the chord ends for a predetermined center angle varying between 118° and 149° and selected at a predetermined angle of 120° for a 6 inch pipe, and higher angles for higher diameter pipes, to define the center angle for the deflector pattern, (b) providing a template sheet for the deflector;

(c) marking off the chord on the template sheet using the markings on the pipe edge to fix the width of the deflector base on the template sheet for the deflector, (d) marking the body length determined by the deflection angle measured at 8° to 12° from the pipe end on the sheet, this marked predetermined distance fixing the location of the triangular apex on the deflector body on the pattern evolving on the sheet, (e) cutting the sheet to form the base dimension to meet the width marking at the pipe edge and thereby form the chord and further cutting in oversize manner the generally triangular sides to extend to a point slightly beyond the apex thereby forming an oversize pattern, (f) trimming the oversize deflector template at the apex at a location short of the top corner of the triangle to form a short straight line parallel to the straight line base, (g) trimming the two sides of the deflector template to form arcuate sides thereof, (h) cutting an abrasion resistant, corrosion resistant, easily weldable ferrous metal sheet to the size of the deflector template to form a deflector body with critical angular dimensions and finally (i) installing said cut and trimmed ferrous metal sheet deflector body in the pipe to which it has been fitted by welding its side edges and apex to the pipe.

2. A method as claimed in claim 1 wherein immediately prior to said welding the generally flat triangularly shaped metal deflector made from said pattern is first placed in the mouth of the inlet pipe to a cyclone, said member is then aligned with its straight line wide base disposed in the parallel relation to the center axis of the cyclone bowl, the base of said deflection member is aligned with the end edge of said inlet pipe, the side edges and apex are welded to the inlet pipe with the above alignment, a metal cap is cut to cover the area of the inlet pipe subtended by the base of the triangularly shaped deflection member for welding to cover the opening of said area, and said cap is then welded to cover said opening.

3. A method as claimed in claim 2 wherein said metal deflector and said cap are welded in stages, first by tack welding followed by inspection to assure proper placement and then by full penetration welding with a welding rod to build up metal to form a curved seam and thereby to assure a tight long-lasting welded joint between the deflection member cap and the pipe.

4. A method as claimed in claim 3 wherein said full penetration welding is finished by grinding and polishing to assure a smooth, continuous surface to the interior of said pipe.

5. A method as claimed in claim 4 wherein said flat triangular metal deflector and cap form a streamlined flow deflector which is L-shaped in cross section with the short leg of the L cross section constituting the cap portion.

6. A method as claimed in claim 4 wherein said flat triangular metal deflector has depending deflector sides which are inclined outwardly of the flat deflector body at an angle to the plane thereof, with said deflector sides welded to the pipe.

7. A method as claimed in claim 6 wherein the depending deflector sides which are inclined outwardly of the flat deflector body at an angle to the plane thereof are welded to the flat body portion.

* * * * *